Patented June 2, 1931

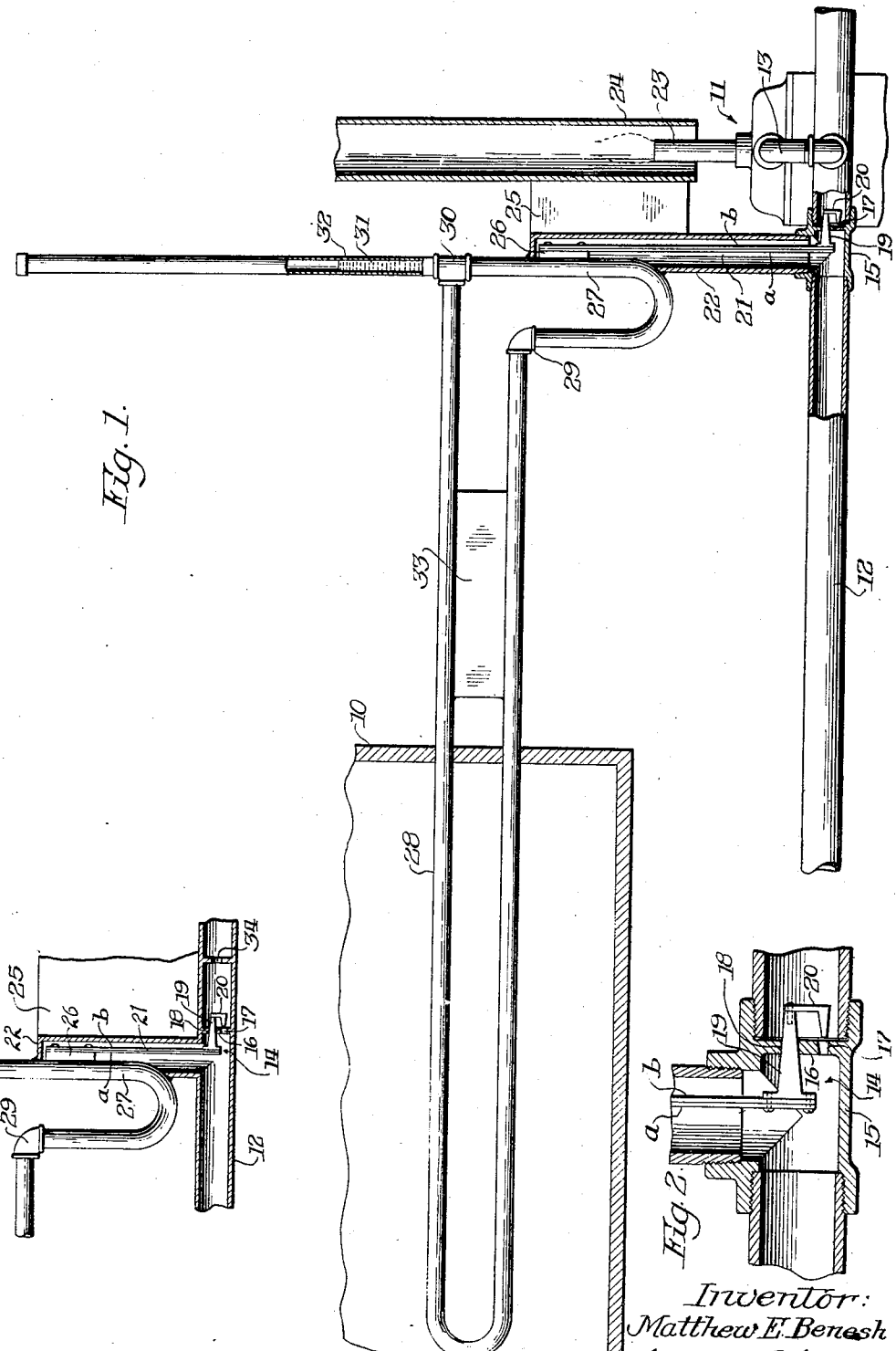

1,808,282

UNITED STATES PATENT OFFICE

MATTHEW E. BENESH, OF CICERO, ILLINOIS

THERMOSTAT

Application filed December 11, 1926. Serial No. 154,052.

The present invention relates to improvements in thermostats, and more particularly thermostats for automatically maintaining certain predetermined conditions, such as the desired temperature in a refrigerator.

An important object of the invention resides in the provision of a thermostat which is affected by a small, well defined and constant range in the temperature under control, to make available a very wide range of temperature for actuating the thermostatic element.

Another object of the invention resides in the provision of a novel thermostat for maintaining a predetermined temperature in a body, which comprises a heating unit having a high thermal head for the thermostatic element, and a convection medium for carrying away heat from said element, the effectiveness of said medium varying over a wide range to cause actuation of said element for a change in said temperature through a small predetermined range.

A more specific object is to provide a thermostat in which a change in temperature resulting from a change in quantity of heat from any suitable source is adapted to actuate a thermostatic element to vary refrigeration, and in which a convection medium subject to said refrigeration consists of a substance having a freezing point corresponding to the refrigerating temperature to be maintained, said substance when in the liquid state circulating to dissipate a relatively large quantity of said heat passing to said element, and when in a solid state dissipating a relatively small quantity of said heat, thus effecting a wide change in temperature of said element upon freezing or melting.

Another object of the invention is to provide a new and improved thermostat which is simple and inexpensive in construction, and which is sensitive and efficient in operation.

A further object resides in the provision of a thermostatically controlled gas valve which is self-cleaning through movements of the valve.

Further objects and advantages will become apparent as the description proceeds.

In the accompanying drawings, Figure 1 is a view, partially in section, of a thermostat embodying the features of my invention.

Fig. 2 is an enlarged sectional view of the valve controlled by the thermostatic element.

Fig. 3 is a fragmentary view of a modification.

While the invention is susceptible of various modifications and alternative constructions, I have shown in the drawings, and will herein describe in detail the preferred embodiment thereof, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention shown in the drawings, the thermostat is adapted to control the temperature in a chamber 10 which in the present instance is a refrigerating chamber refrigerated through the use of a gas burner in a well known manner (not disclosed). Thus, the burner may be used to heat the generator of an absorption system. The gas burner may be the gas burner 11, or any other suitable burner (not shown). The thermostat, although especially adapted for use in refrigerators, is suitable for many other uses, and it is to be understood that such uses are contemplated as falling within the invention. Fuel is supplied to the burner (not shown) and/or the burner 11 through a fuel main 12, the burner 11 being connected into the main by a pipe 13.

The flow of fuel through the main 12 is controlled by a valve 14 (see Fig. 2) which comprises a T-joint 15 interposed in the main. One end of the joint 15 is closed by a wall or web 16 formed with an outwardly flared port 17 and with an inwardly flared port 18. A tapered needle member 19 extends through the port 18, and controls the passage of fuel therethrough. Secured to the outer end of the needle member 19 is a tapered needle member 20 adapted to be moved into and out of the port 17 upon movement of the member 19. The members 19 and 20 are so arranged that when the port 17 is completely open the port 18 is completely closed, and when the port 17 is completely closed the port 18 is open. The maximum effective passage through the port 17 is larger than that through the port 18, so that when the port 17 is closed the amount of fuel passing through the main 12 is restricted. Reduction in the flow of fuel will tend through the refrigerating means (not shown and forming no part of the present invention) to lower the refrigeration in the chamber 10.

Gas passing through a small orifice, such as the port 17 or 18, tends to have a clogging effect. By providing two valve ports instead of one port, the valve operating as described in the foregoing, the valve parts can come into direct closed engagement so as to clean the ports without interrupting the flow of gas.

The needle member 19 is mounted in the joint 15 on the free lower end of a bi-metallic thermostatic element 21 which comprises two metal strips $a$ and $b$ having different coefficients of expansion and contraction so that changes in temperature will cause the free end to move laterally. The thermostatic element 21 extends upwardly into an elongated cylindrical shell 22 which is closed at its upper end, and which opens at its lower end into the joint 15.

The burner 11 is adapted to provide a wide temperature change for the thermostatic element 21 when the temperature in the chamber 10 passes through a small, well defined predetermined range. The burner 11 comprises a burner tube 23 which extends into an elongated cylindrical chimney 24 mounted on a block 25. The latter is mounted on the upper end of the shell 22, and is made of heat conducting material, such as iron, so that heat from the chimney 24 will be transmitted to the shell. The upper end of the thermostatic element 21 is rigidly secured to a heat conducting plate 26 which is mounted on a pipe 27 positioned longitudinally in one side of the shell 22. Heat passes from the shell 22 through the wall of the pipe 27 and the conducting plate 26 to the element 21. The heat is supplied under a high thermal head so that variations in the quantity of heat in the element 21 will cause decided temperature changes.

Means is provided for carrying away or dissipating heat from the element 21. This means comprises a convection medium unit which is exposed at one end to the refrigeration in the chamber 10 and which at its other end includes the pipe 27. In the present instance the unit comprises the pipe 27 which is U-shaped, and a U-shaped pipe 28, the legs of the pipes being connected by suitable joints 29 and 30. The pipes 27 and 28 constitute a closed circulating line for a suitable fluid 31. The fluid 31 is such that it will freeze at or near the temperature to be maintained in the chamber 10. In refrigeration, benzol is a suitable fluid. To permit expansion of the fluid 31 with changes in temperature, a vertical riser pipe 32 opens into the joint 30.

When the temperature is below the freezing point of the fluid 31, the latter will be frozen and will not circulate. As a result, a relatively small quantity of heat will be conducted away from the element 21, and hence the latter will occupy a position in which the port 17 is closed and the port 18 is open, thereby restricting the flow of gas or fuel through the main 12. The needle 20 in closing the port 17 will clean the latter. If the temperature in the chamber 10 is or rises above the freezing point of the fluid 31, the latter will circulate through the pipes 27 and 28 and will thereby dissipate a relatively large quantity of heat in the thermostatic element 21. As a result, the element 21 will occupy a position in which the port 17 is open and the port 18 is closed, thus permitting a maximum flow of fuel through the main 12. The needle 19 in closing the port 18 cleans the latter.

The legs of the pipe 28 are positioned closely together and are connected by a heat exchange block 33 of suitable conducting material to prevent heat from the burner 11 from being carried into the chamber 10 by the circulating fluid 31.

In Fig. 3, I have shown a restricted orifice 34 in the fuel main 12. The latter is positioned in contact with the conducting block 25 so that heat in the block will be transmitted to the fuel. When the temperature of the fuel rises or falls, as it will with freezing or melting of the fluid 31, the density of the fuel will vary substantially. As a result, more or less fuel will flow through the orifice 34. While I have shown both the valve 14 and the orifice 34 in Fig. 3, it is to be understood that each can be employed separately for carrying out the control.

It will be evident that I have provided a thermostat which is simple and inexpensive in construction, and which is operable through a small temperature change to render available a relatively large quantity of heat having a high thermal head for controlling the flow of fuel, thereby providing an accurate and sensitive control with an elementary construction. It is to be understood that while the thermostat is described as a control for a burner (not shown) for causing refrigeration of the chamber 10, it may be used to control anything which will affect the temperature of said chamber. While I have described the fluid 31 as being a liquid, any fluid effective by a small change in temperature in the body 10 to vary the temperature of the thermostatic element 21 through a wide range may be used.

I claim as my invention:

1. A thermostat having, in combination, a thermostatic element adapted to control the temperature of a body, means for transmitting heat to said element, and means subject to said temperature for dissipating heat in said element, the effectiveness of said last mentioned means in dissipating said heat varying over a wide range to actuate said element when said temperature passes through a relatively small predetermined range.

2. A thermostat for a refrigerator in which refrigeration is produced through the consumption of gas, comprising in combination, a valve controlling the flow of gas, a thermostatic element for controlling said valve, means for supplying heat to said thermostatic element, and a heat dissipating unit exposed to the refrigeration, said unit being effective to dissipate a definite quantity of heat passing to said thermostatic element when the refrigerating temperature is above a certain point, and to dissipate a substantially different quantity of said heat when the refrigerating temperature is below a certain point.

3. A thermostat having, in combination, a valve for controlling the temperature of a body, a thermostatic element for controlling said valve, a source of heat, means for transmitting heat from said source to said thermostatic element, and means adapted to be exposed to the temperature in said body, said means being adapted to dissipate heat from said source in substantially different quantities to cause a substantial difference in the temperature of said element when the temperature in said body is on opposite sides of a predetermined point.

4. A thermostat having, in combination with a fluid line, a valve in said line, a thermostatic element connected to said valve for actuating the latter, means for transmitting heat from any suitable source to said element, and temperature controlled means connected to said last mentioned means and being effective to dissipate a quantity of the heat being conducted to said element when the temperature controlling same is on one side of a predetermined range, and to dissipate a different quantity of heat when said temperature is on the other side of said range, the change in quantity of heat dissipated being widely disproportionate to the change in said temperature.

5. A thermostat for a refrigerator in which refrigeration is produced through the use of a fuel, having, in combination, a thermostatic valve for controlling the passage of fuel, means for supplying heat to said thermostatic valve to actuate the latter, and means adapted to be subjected to the refrigeration temperature, said last mentioned means being effective when the refrigerating temperature is above a predetermined range to dissipate a relatively large quantity of heat from said valve, and being effective when the refrigerating temperature falls below said range to dissipate a relatively small quantity of heat from said valve.

6. A thermostat for a refrigerator, having, in combination, a thermostatic valve for controlling the temperature in said refrigerator, a circulating line adapted to be exposed to the refrigeration, means for transferring heat through a portion of said line to said thermostatic valve, and a fluid in said line having a freezing point corresponding to the refrigerating temperature to be maintained, said fluid when above its freezing temperature being adapted to circulate and thereby dissipate one quantity of heat from said valve, and when frozen being unable to circulate and hence being adapted to dissipate a much smaller quantity of said heat, so that a change from one condition to the other will cause a substantial change in the temperature of said valve.

7. A thermostat, having in combination, a circulating fluid pipe adapted to be exposed to the heat in a body, and containing a fluid having a freezing point corresponding to the temperature to be maintained in said body, a thermostatic element connected to one part of said pipe and adapted to control said temperature, and a heat supply means connected to said pipe next to said element for supplying heat through said pipe walls to said element.

8. A thermostat comprising, in combination with a low temperature chamber, a valve, a thermostatic element for controlling said valve, means for supplying heat to said element, and a heat dissipating unit exposed to the temperature in said chamber, said unit being effective when the temperature in said chamber is above a predetermined point to dissipate to said chamber a definite quantity of heat passing to said element and when the temperature in said chamber is below said point to dissipate a substantially different quantity of heat.

In testimony whereof, I have hereunto affixed my signature.

MATTHEW E. BENESH.